(12) United States Patent
Abou Gazala et al.

(10) Patent No.: US 9,280,194 B2
(45) Date of Patent: Mar. 8, 2016

(54) DYNAMIC LINK WIDTH MODULATION

(75) Inventors: Neven M. Abou Gazala, Kirkland, WA (US); James W. Alexander, Hillsboro, OR (US); Devadatta V. Bodas, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 675 days.

(21) Appl. No.: 13/532,743

(22) Filed: Jun. 25, 2012

(65) Prior Publication Data

US 2013/0346772 A1  Dec. 26, 2013

(51) Int. Cl.
| | | |
|---|---|---|
| G06F 1/26 | (2006.01) | |
| G06F 1/32 | (2006.01) | |
| G06F 13/38 | (2006.01) | |
| G06F 11/14 | (2006.01) | |
| H04L 12/40 | (2006.01) | |
| G06F 11/34 | (2006.01) | |
| G06F 13/40 | (2006.01) | |
| G06F 13/16 | (2006.01) | |
| H04L 12/24 | (2006.01) | |
| H04B 5/00 | (2006.01) | |
| G06F 12/08 | (2006.01) | |

(52) U.S. Cl.
CPC ............... *G06F 1/32* (2013.01); *G06F 1/3278* (2013.01); *G06F 1/3253* (2013.01); *G06F 11/1423* (2013.01); *G06F 11/349* (2013.01); *G06F 12/0831* (2013.01); *G06F 13/1678* (2013.01); *G06F 13/38* (2013.01); *G06F 13/4018* (2013.01); *G06F 13/4027* (2013.01); *G06F 2213/0062* (2013.01); *H04B 5/0031* (2013.01); *H04L 12/4013* (2013.01); *H04L 41/0896* (2013.01); *Y02B 60/126* (2013.01)

(58) Field of Classification Search
CPC ............ G06F 12/0831; G06F 13/1678; G06F 13/4027; G06F 13/38; G06F 13/4018; G06F 1/3253; G06F 11/349; G06F 1/32; G06F 11/1423; G06F 2213/0062; H04L 41/0896; H04L 12/4013; H04B 5/0031
USPC ....................................................... 713/320
See application file for complete search history.

(56) References Cited

U.S. PATENT DOCUMENTS

| | | | |
|---|---|---|---|
| 7,480,808 B2 * | 1/2009 | Caruk et al. .................. 713/300 |
| 7,949,817 B1 * | 5/2011 | Sakarda ........................ 710/307 |
| 2009/0150689 A1 * | 6/2009 | Simeral et al. ................ 713/300 |
| 2011/0113163 A1 * | 5/2011 | Eggleston ...................... 710/15 |
| 2012/0128349 A1 * | 5/2012 | Mitsunaga et al. ............. 398/25 |
| 2013/0111226 A1 * | 5/2013 | Ananthakrishnan et al. . 713/300 |
| 2013/0159761 A1 * | 6/2013 | Baumgartner et al. ........ 714/4.5 |

* cited by examiner

*Primary Examiner* — Jaweed A Abbaszadeh
*Assistant Examiner* — Xuxing Chen
(74) *Attorney, Agent, or Firm* — Schwabe, Williamson & Wyatt, P.C.

(57) ABSTRACT

Described herein are embodiments of an apparatus configured for dynamic link width modulation, a system including an apparatus configured for dynamic link width modulation, a method for dynamic link width modulation, and computer-readable media having instructions that, if executed by one or more processors, cause an apparatus to perform a dynamic link width modulation method. An apparatus configured for dynamic link width modulation may include a first counter for determining a length of a queue of packets at a source of a link, a second counter for determining a rate of utilization of the link, and a power control unit configured to modify a width of the link based at least in part on the length of the queue and the rate of utilization. Other embodiments may be described and/or claimed.

21 Claims, 5 Drawing Sheets

DYNAMIC LINK WIDTH MODULATION

TECHNICAL FIELD

Embodiments of the present disclosure relate generally to the field of data link power management, and more particularly, to methods, apparatuses, computer-readable media, and systems for dynamic link width modulation.

BACKGROUND

A processor of a computing system may be interconnected with various other components of the system such as, for example, memory and I/O units. An interconnect between the processor and other system components may include one or more data links, each including a number of lanes.

In some computing systems, high-speed data links may tend to draw significant amounts of system power. To reduce power consumption, some solutions include modulating link width by switching off data bit lines based on link utilization. While this method may be effective in addressing the average behavior of data traffic, link usage must be monitored across a time interval to converge on average values, which may result in the link losing the opportunity to react to traffic fluctuations. As a result of residing too long in one width, the system may experience either higher power or higher latency.

In addition, using utilization to decide the link width may not be scalable as far as performance and latency is concerned. For example, in a processor with 10 cores, but with only one out of 10 cores currently active, the overall bandwidth and utilization of the link may be very low. A strictly utilization/bandwidth-based width control would make the link width lowest possible. If the one active core needs extensive accesses over the link then as compared to full width, the latency, and thus, performance of that core may tend to degrade.

BRIEF DESCRIPTION OF THE DRAWINGS

Embodiments of the present disclosure will be described by way of example embodiments, but not limitations, illustrated in the accompanying drawings in which like references denote similar elements, and in which.

Figure 1:
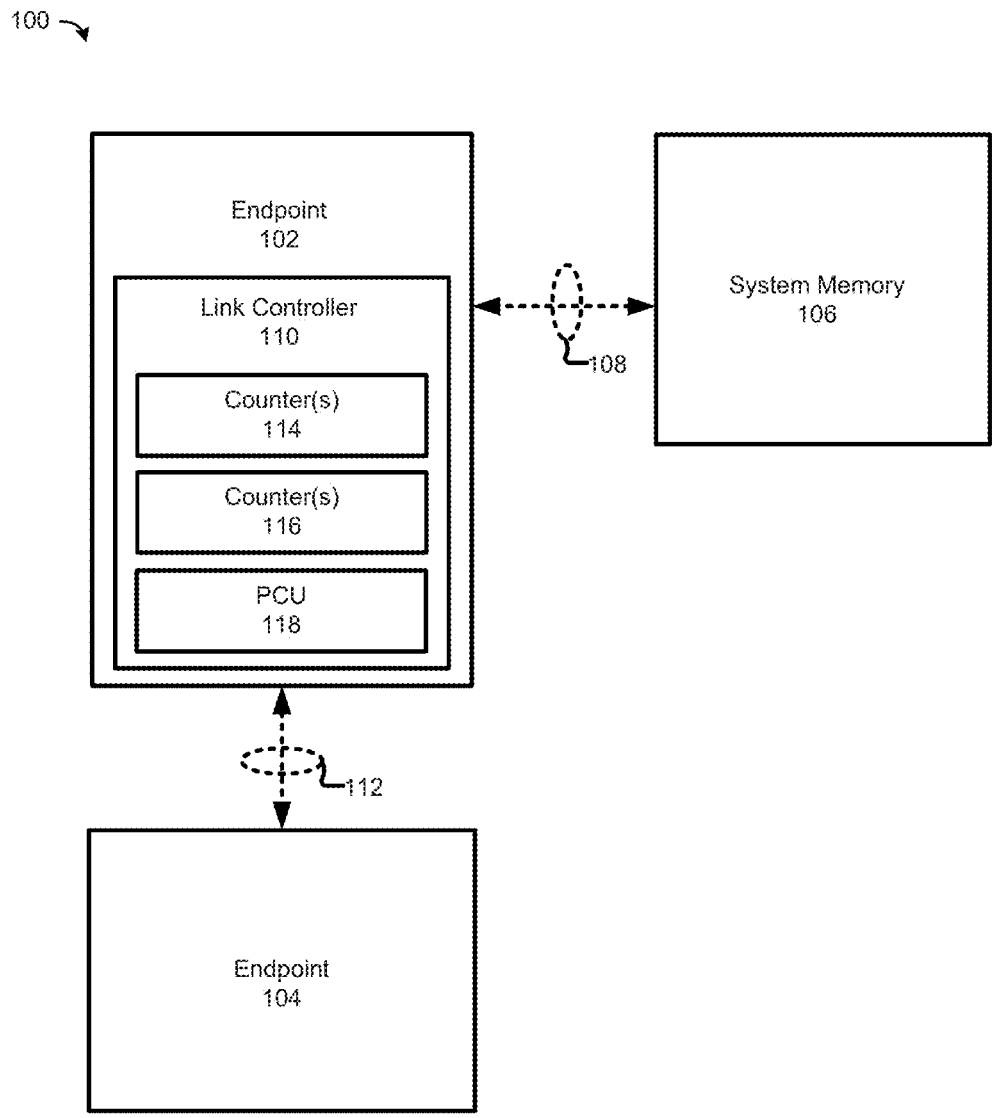
FIG. 1 illustrates an example computing system including a link controller configured for dynamic link width modulation.

all in accordance with embodiments of the present disclosure.

DETAILED DESCRIPTION

Described herein are embodiments of an apparatus configured for dynamic link width modulation, a system including the apparatus configured for dynamic link width modulation, a method for dynamic link width modulation, and computer-readable media having instructions that, if executed by one or more processors, cause an apparatus to perform a dynamic link width modulation method.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various aspects of the illustrative implementations are described herein using terms commonly employed by those skilled in the art to convey the substance of their work to others skilled in the art. It will be apparent to those skilled in the art, however, that embodiments of the present invention may be practiced with only some of the described aspects. For purposes of explanation, specific numbers, materials and configurations are set forth in order to provide a thorough understanding of the illustrative implementations. It will be apparent to one skilled in the art, however, that embodiments of the present invention may be practiced without the specific details. In other instances, well-known features are omitted or simplified in order not to obscure the illustrative implementations.

Further, various operations are described as multiple discrete operations, in turn, in a manner that is most helpful in understanding the illustrative embodiments; however, the order of description should not be construed as to imply that these operations are necessarily order dependent. In particular, these operations need not be performed in the order of presentation. Moreover, methods within the scope of this disclosure may include more or fewer steps than those described.

For the purposes of the present disclosure, the phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

The description may use the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various entities may be introduced and described with respect to the operations they perform. It will be understood that these entities may include hardware, software, and/or firmware elements that are cooperatively configured to provide the described operations.

FIG. 1 illustrates an example computing system 100 in accordance with some embodiments. The system 100 may include endpoints 102, 104.

In various embodiments, each of the one or both of the endpoints 102, 104 may comprise one or more processors. In various ones of these embodiments, one or both of the endpoints 102, 104 may be a central processing unit of the system 100. In other embodiments, one of the endpoints 102, 104 may comprise one or more processors while the other one of the endpoints 102, 104 may comprise a chipset, a display or other peripheral, etc. In some embodiments, a chipset, which may include, for example, one or more of memory, integrated peripherals, graphics controllers, interfaces to external peripherals, etc. In still further embodiments, one of the endpoints 102, 104 may comprise a chipset while the other one of the endpoints 102, 104 may comprise another chipset, a peripheral, etc.

In various embodiments in which one or both of the endpoints 102, 104 comprises one or more processors, the one or more processors may include one core or multiple cores. In some embodiments, the system 100 may be a multiprocessor system where each of the processors has one or multiple cores.

The system 100 may include system memory 106, which may be part of a chipset or may be separate from the chipset. As shown in FIG. 1, the endpoint 102 may be operatively coupled to system memory 106 through one or more links 108 (e.g., interconnects, buses, etc.). The system memory 106 may be capable of storing information that the endpoint 102 utilizes to operate and execute programs and operating systems. In different embodiments, the system memory 106 may be any usable type of readable and writeable memory such as a form of dynamic random access memory.

The system 100 may include one or more link controllers 110. The link controller 110 may be configured to dynamically modulate a width of a link 112 interconnecting the endpoint 102 with various other components of the system 100 such as, for example, endpoint 104.

Figure 2:
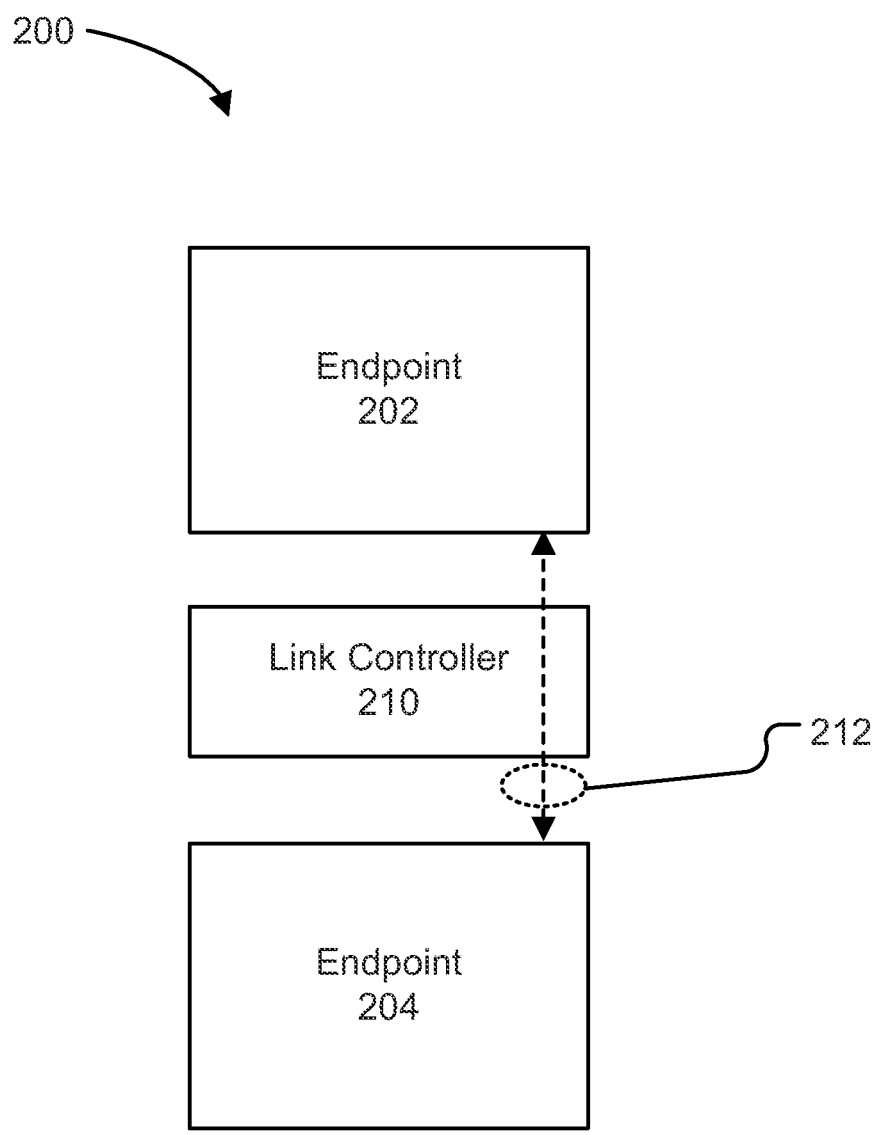
FIG. 2 illustrates another example computing system including a link controller configured for dynamic link width modulation.

As shown, a link controller 110 may be integrated with the endpoint 102 for dynamically modulating a width of the link 112 interconnecting the endpoint 102 with the endpoint 104. FIG. 2 illustrates another configuration of a system 200 including a link controller 210 configured to dynamically modulate a width of a link 212 and which may be similar to the link controller 110 of FIG. 1 except that the link controller 210 is a discrete component separate from the endpoints 202, 204.

With reference again to FIG. 1, the link controller 110 may be configured to dynamically modulate the width of the link 112 by opportunistically disabling lanes of the link 112 at low data loads while taking into account the rate of data arrivals at an endpoint of the link 112. To compensate for the trade-off between power and performance, the link controller 110 may be configured to effectively adapt the objective of the power management policy based on load. At low load, the policy may favor decisions that optimize power by maximizing link residency at narrower widths, whereas at high load, the policy may favor decisions that optimize performance by gradually increasing width to reduce queuing latencies.

Embodiments of the link controller 110 may be configured to take into consideration that many applications experience periods of high data activity (bursts) followed by low activity periods, in which the periods vary in length, and the boundaries of these activity periods may be desirable times to change the width of the link 112. Rather than modulating the width of the link 112 based on average traffic behavior, the link controller 110 may be configured to efficiently schedule a width change by detecting boundaries of activity periods (e.g., the beginning or end of data bursts) and modifying the width at these boundaries. In this configuration, the link controller 110 may reduce power consumption at low load and minimize performance loss at high load.

Various embodiments of the link controller 110 may use queue residency as a direct measure of data latency as the longer a packet is queued up, the longer its round-trip latency is, and as queuing delay may be proportional to queue length. Any changes in the queue length may mark the start and end of a data burst and this may trigger a decision by the link controller 110 to re-evaluate the width of the link 112.

For the embodiment illustrated in FIG. 1, the link controller 110 includes one or more first counters 114, one or more second counters 116, and a power control unit 118, any one or more of which may comprise firmware or hardware. One or more aspects of the link controller 110 may be implemented in hardware or firmware. In various embodiments, one or more of the operations of the link controller 110 may be implemented in hardware, software, and/or firmware elements that are cooperatively configured to provide the described operations.

The one or more first counters 114 of the link controller 110 may be configured to determine a length of a queue of packets at a source of the link 112. In other words, the one or more first counters 114 determine the length of the queue of packets at endpoint 102 or endpoint 104 with the destination being the other one of endpoint 102 or endpoint 104. The one or more second counters 116 may be configured to determine a rate of utilization of the link 112 by maintaining a count of the data packets sent over the link 112 versus the idle slots the link 112 experiences in a given period. The power control unit 118 unit may be configured to modify a width of the link 112 based at least in part on the determined length of the queue and the determined rate of utilization.

The power control unit 118 may be configured to modify the width of the link 112 based at least in part on a comparison of the length of the queue to a threshold length and a comparison of the rate of utilization to a threshold utilization rate. In various embodiments, a set of threshold length values may include individual threshold length values, each corresponding to a desired link width, and similarly, a set of threshold utilization rate values may include individual threshold utilization rate values, each corresponding to a desired link width. Example sets of threshold length values Qlen_th (and corresponding link width scaling factors Qlen_L0p) and threshold utilization rate values Util_th (and corresponding link width scaling factors Util_L0p) are shown in Table 1.

TABLE 1

| Qlen_th | Qlen_L0p |
|---------|----------|
| 32+     | 1        |
| 16+     | 0.5      |
| 0+      | 0.25     |

| Util_th | Util_L0p |
|---------|----------|
| 40%+    | 1        |
| 20%+    | 0.5      |
| 0%+     | 0.25     |

In various embodiments, a change in width of the link 112 may be triggered by reaching a given queue length threshold at which point a translation from threshold to width is performed for values of both counters 114, 116. The power control unit 118 may be configured to compare the length of the queue with a threshold length corresponding to a first link width scaling factor, and compare the rate of utilization with a threshold utilization rate corresponding to a second link width scaling factor. For example, in a computing system having a link including three available widths of full (1), half (0.5), and quarter (0.25) with threshold values corresponding to those shown in Table 1. In this example, if the link's source queue has an occupancy of 18 entries and a utilization rate of 25%, the corresponding link width scaling factor Qlen_L0p and Util_L0p would both be 0.5. The power control unit 118 may then compare the link width scaling factors and modify the width of the link 112 accordingly. In this example, the link width scaling factors match and so the power control unit 118 would modify the width of the link 112 by the link width scaling factor 0.5 (i.e., to half width).

If, on the other hand, there is conflict between the link width factor Qlen_L0p and Util_L0p, the power control unit 118 may modify the width of the link 112 by greater of the link width scaling factors. For example, if the link's source queue has an occupancy of 18 entries and a utilization rate of 17%, the corresponding link width scaling factor Qlen_L0p would be 0.5 while the link width scaling factor for Util_L0p would be 0.25. In this case, the power control unit 118 would modify the width of the link 112 by the link width scaling factor 0.5 (i.e., to half width), which is greater than 0.25. It should be noted that the power control unit 118 may modify the link width by the greater of the link scaling factors as this would provide for a better performance of the computing system. It is possible, however, that in other embodiments, the power control unit 118 may modify the width of the link 112 by the lesser of the returned link width scaling factors.

The power control unit 118 may be configured to set the queue length threshold values Qlen_th and the utilization rate threshold values Util_th. In various embodiments, the power control unit 118 may be configured to set the queue threshold length values Qlen_th based at least in part on the source queue's maximum occupancy with a linear mapping between queue length and the link width. For example, where a link composed of b lanes and a source queue of q entries, for the threshold to transition to a link width of b/m, the queue length may be required to be at least q/m, where m is the link width scaling factor. Utilization rate thresholds Util_th may be based on the expected processor loads levels with respect to the link utilization levels. In some embodiments, the expected processor loads may be obtained through profiling common applications expected to run on the computing system.

In various embodiments, the threshold values Qlen_th, Util_th may be dynamically modified. Such dynamic resetting of the threshold values can be done on a periodic basis and/or on the instance of certain events. For example, in various embodiments in which endpoint 102 comprises a processor, the threshold value may be reset based at least in part on the number of active core(s) of the processor, utilization level of the active core(s), or some other event of another element of the system 100. For embodiments in which the threshold values Qlen_th, Util_th are dynamically modified on a periodic basis, the period may be fixed or may be determined by latency of link width transition.

Table 2 shows examples of queue length threshold values Qlen_th and the utilization rate threshold values Util_th for a system in which the threshold value may be dynamically modified based on the number of active cores of the processor. The example threshold values may be example for modifying a link width from half width to full width for a processor that has 10 cores.

TABLE 2

| Number of active cores | Qlen_th | Util_th |
|---|---|---|
| 1-2 | 6 | 15%+ |
| 3-4 | 8 | 20%+ |
| 5-6 | 12 | 30%+ |
| 7-8 | 12 | 40%+ |
| 9-10 | 16 | 50%+ |

In this example, the queue length threshold may be increased as more processor cores become active and decreased as the number of active processor cores decrease. Similarly, the utilization rate threshold values may be increased as more processor cores become active and decreased as the number of active processor cores decrease. Although example dynamic thresholds are only shown here from transitioning between half and full width, in various embodiments, additional threshold values may be provided for transitioning on a finer scale (e.g., for quarter, third, half, etc., link width scaling factors).

Figure 3:
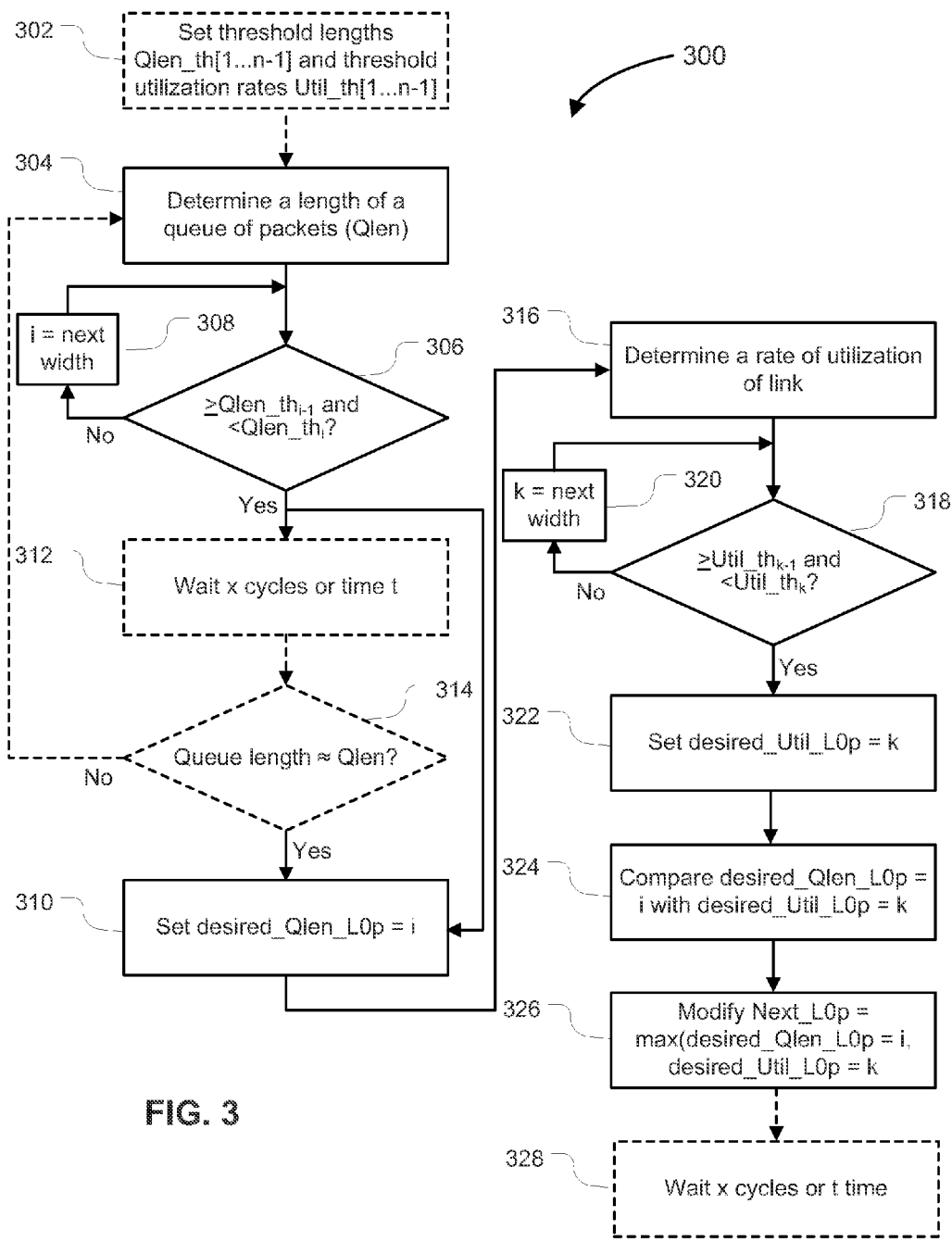
FIG. 3 is a flow chart depicting a method for dynamic link width modulation.

For a clearer understanding of the various embodiments described herein, FIG. 3 is a flowchart depicting a dynamic link width modulation method 300, which may be performed by a link controller (such as, for example, link controller 110 or 210) in accordance with the embodiments described herein. The method 300 may include one or more functions, operations, or actions as is illustrated by block 302, 304, 306, 308, 310, 312, 314, 316, 318, 320, 322, 324, 326, and/or block 328.

Processing for the method 300 may start with block 302 by setting the threshold length Qlen_th and the threshold utilization rate Util_th values. As described herein, threshold values may be included in a set of threshold values, each value corresponding to a link width scaling factor. As such, at block 302, sets of threshold lengths Qlen_th[1 . . . n−1] and threshold utilization rates Util_th[1 . . . n−1] may be set. In various embodiments, the threshold length and threshold utilization rate values may be set by a power control unit of a link controller. In various embodiments, the threshold length Qlen_th and the threshold utilization rate Util_th values may be set once during some period, or may be pre-set, and not re-set on each iteration of the method 300. In these latter embodiments, block 302 may be omitted or performed on any desired frequency or occurrence of specified events, as described more fully elsewhere.

In various embodiments, one or more operations may be implemented to avoid or minimize fluctuations between width modifications. For example, during periods of high data loads, the number of available link widths may be limited so as to avoid the use of narrow widths to avoid transition overheads.

The method 300 may proceed to block 304 by determining a length of a queue of packets (Qlen) at a source of a link of an apparatus and a rate of utilization of the link.

The method 300 may proceed to block 306 by comparing the length of the queue Qlen to a threshold length (Qlen_th$_i$). In various embodiments, the length of the queue may first be compared to a threshold length corresponding to a link width scaling factor i (for example, full width 1), and if the length of the queue is less than or equal to the first threshold length but greater than a second threshold length corresponding to a link width scaling factor of a step below the link width scaling factor i (Qlen_th$_{i-1}$) (for example, half width, 0.5), then the method 300 may proceed to block 310 by setting the desired link width for the queue length (desired_Qlen_L0p) to i.

If, on the other hand, the length of the queue is not less than or equal to the first threshold length but greater than a second threshold length, then the method 300 may proceed to block 308 by setting i to the next width (e.g., decrement by one step) and then returning to block 306.

In some embodiments, before proceeding to instigating a link width change, the method 300 may require a queue length to persist at a value or higher for some number of cycles or some period of time to avoid unnecessary width modifications for transient events. In these embodiments, the method 300 may proceed from block 306 to block 312 by waiting x cycles or time t, and then proceed to block 314 to determine if the queue length is equal to (or greater than or less than, depending on the embodiments) to Qlen as determined in block 304, then the method 300 may proceed to block 310. Otherwise, the method 300 may proceed back to block 304.

The method 300 may proceed to block 316 by determining a rate of utilization of the link.

The method 300 may proceed to block 318 by comparing the rate of utilization to a threshold utilization rate (Util_th$_k$). In various embodiments, the utilization rate may first be compared to a first threshold utilization rate corresponding to a link scaling width factor k (for example, full width 1), and if the utilization rate is less than or equal to the first threshold utilization rate but greater than a second utilization rate corresponding to a link width scaling factor of a step below the link width scaling factor k (Util_th$_{k-1}$) (for example, half width, 0.5), then the method 300 may proceed to block 322 by setting the desired link width for the utilization rate (desired_Qlen_L0p) to k.

If, on the other hand, the utilization rate is not less than or equal to the first threshold utilization rate but greater than a second threshold utilization rate, then the method 300 may proceed to block 320 by setting k to the next width (e.g., decrement by one step) and then returning to block 318.

The method 300 may proceed to block 324 by comparing the link width scaling factor i to the link width scaling factor k, and then to block 326 by modifying the width of the link by the greater of i and k.

In various embodiments, the operations of blocks 304-314 may be performed after performing the operations of blocks 316-322 such that the desired link width for the utilization rate (desired_Qlen_L0p) is set prior to the desired link width for the queue length (desired_Qlen_L0p).

In various embodiments, the method 300 may optionally proceed to block 328 by waiting x cycles or time t after the link width change before making another link width change. Delaying after each width change may allow the system to flush out the effects of the last width change before implementing another link width change. For example, a transition from a smaller width to a larger width may be expected to be accompanied by a large queue depth, which may be further exacerbated by high transition delays (as entries tend to "pile up" in the queue waiting for the larger width to become available).

Advantageously, the described methods may provide the flexibility to transition among any number of link widths without being required to transition between widths incrementally. In various embodiments, if the queue length has increased or decreased by more than the threshold of adjacent width, the link width can be modified in a single transition, which may reduce transition overhead. For example, for a transition from a quarter width to a full width, rather than switching from quarter to half, and then from half to full (which would incur two transitions), various embodiments described herein permit modifying a link width directly from quarter width to full width (which would incur just one transition).

Figure 4:
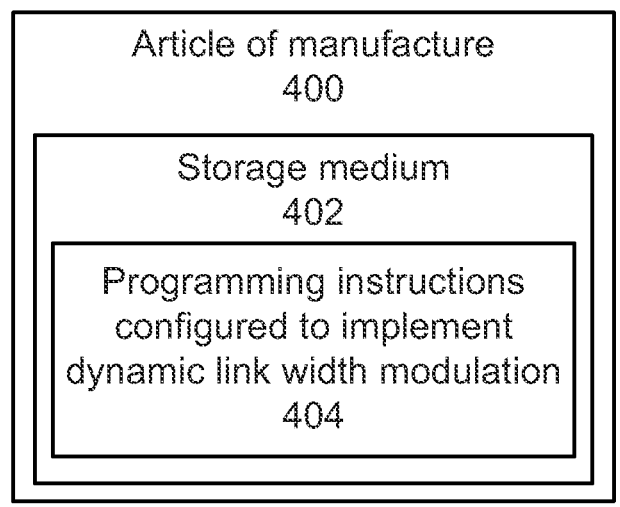
FIG. 4 illustrates an article of manufacture having programming instructions configured to cause an apparatus to practice some or all aspects of dynamic link width modulation (of the method of FIG. 3, for example)

In various embodiments, an article of manufacture may be employed to implement one or more methods as disclosed herein. FIG. 4 describes an example article of manufacture 400. As shown, the article of manufacture 400 may include a computer-readable non-transitory storage medium 402 including programming instructions 404. The programming instructions 404 may enable an apparatus, in response to their execution by the apparatus, to perform various operations described herein. For example, the non-transitory storage medium 402 may include programming instructions 404 configured to cause an apparatus or system to practice some or all aspects of dynamic link width modulation of the method of FIG. 3, for example, in accordance with embodiments of the present disclosure.

The non-transitory storage medium 402 may represent a broad range of persistent storage medium known in the art, including but not limited to flash memory, dynamic random access memory, static random access memory, an optical disk, a magnetic disk, etc.

Figure 5:
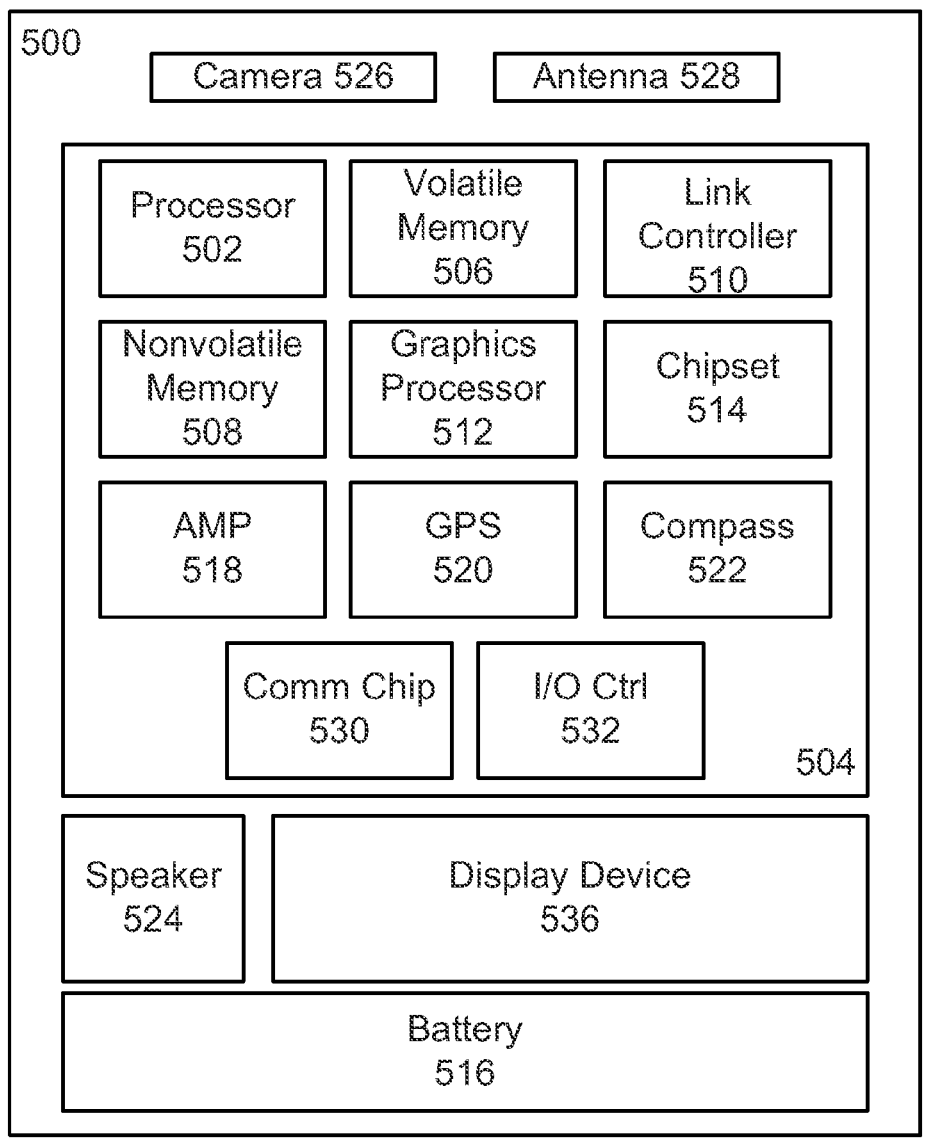
FIG. 5 is a block diagram of a system incorporating a link controller configured for dynamic link width modulation.

Another embodiment of a system 500 incorporating dynamic link width modulation is illustrated in FIG. 5. In various embodiments, the system 500 may include more or fewer components, and/or different architectures than that shown in FIG. 5.

In various implementations, the system 500 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 500 may be any other electronic device that processes data.

The system 500 may include a link controller 510 for dynamic link width modulation in accordance with various embodiments described herein. Although not shown here, the link controller 510 may include, for example, one or more first counters for determining a length of a queue of packets at a source of a link, one or more second counters for determining a rate of utilization of the link, and a power control unit for modifying a width of the link based at least in part on the determined length of the queue and the determined rate of utilization.

In various embodiments, the processor 502 may be physically and electrically coupled with the motherboard 504. Depending on its applications, the system 500 may include other components that may or may not be physically and electrically coupled to the motherboard 504. These other components include, but are not limited to, volatile memory 506 (e.g., dynamic random access memory (DRAM)), non-volatile memory 508 (e.g., read only memory (ROM)), flash memory, a graphics processor 512, a digital signal processor, a crypto processor, a chipset 514, a battery 516, an audio codec, a video codec, a power amplifier 518, a global positioning system (GPS) device 520, a compass 522, an accelerometer, a gyroscope, a speaker 524, a camera 526, an antenna 528, and a mass storage device (such as hard disk drive, compact disk (CD), digital versatile disk (DVD), and so forth).

The system 500 may include at least one communications chip 530 operatively to facilitate communication of the system 500 over one or more networks and/or with any other suitable device. The system 500 may also include at least one I/O controller 532, and in some implementations, the at least one I/O controller 532 may be part of the at least one communication chip 530. In some implementations the at least one communication chip 530 may be part of the processor 502.

The communication chip 530 may enable wireless communications for the transfer of data to and from the system 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 530 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 2G, 3G, 4G, 5G, and beyond. In some implementations, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others.

The system 500 may include a display device 536, such as, for example, a cathode ray tube (CRT), liquid crystal display (LCD), light emitting diode (LED), or other suitable display device. The display device 536 may be a touch screen display supporting touch screen features, and in various one of these embodiments, the I/O controller 532 may include a touchscreen controller. In various embodiments, the display device 536 may be a peripheral device interconnected with the system 500.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
    a first counter to determine a length of a queue of packets at a source of a link;
    a second counter to determine a rate of utilization of the link; and
    a power control unit to modify a width of the link based at least in part on the length of the queue and the rate of utilization;
    wherein the power control unit is to compare the length of the queue with a threshold length corresponding to a first link width scaling factor, compare the rate of utilization with a threshold utilization rate corresponding to a second link width scaling factor, compare the first link width scaling factor to the second link width scaling factor, and modify the width of the link by the first link width scaling factor or the second link width scaling factor based on the comparison of the first link width scaling factor to the second link width scaling factor.

2. The apparatus of claim 1, wherein the power control unit is to modify the width of the link by the greater of the first link width scaling factor and the second link width scaling factor.

3. The apparatus of claim 1, wherein the power control unit is to set the threshold length and the threshold utilization rate.

4. The apparatus of claim 3, wherein the power control unit is to modify at least one of the threshold length and the threshold utilization rate based at least in part on a number of active processor cores of the apparatus.

5. The apparatus of claim 3, wherein the power control unit is to modify at least one of the threshold length and the threshold utilization rate after a predetermined period of time elapses from a previous modification of the at least one of the threshold length and the threshold utilization rate.

6. The apparatus of claim 1, wherein the power control unit is to delay modifying the width of the link until a predetermined period of time elapses from a previous modification of the width of the link.

7. The apparatus of claim 1, wherein the first counter, the second counter, and the power control unit are integrated in a processor.

8. The apparatus of claim 1, further comprising a processor and a chipset operatively coupled to the processor, wherein the first counter, the second counter, and the power control unit are included in the chipset.

9. A system comprising:
    a link controller including:
        a first counter to determine a length of a queue of packets at a source of a link;
        a second counter to determine a rate of utilization of the link; and
        a power control unit to modify a width of the link based at least in part on the length of the queue and the rate of utilization;
    one or more processors operatively coupled with the link controller; and
    a display device operatively coupled to the link controller and the one or more processors;
    wherein the power control unit is to compare the length of the queue with a threshold length corresponding to a first link width scaling factor, compare the rate of utilization with a threshold utilization rate corresponding to a second link width scaling factor, compare the first link width scaling factor to the second link width scaling factor, and modify the width of the link by the first link width scaling factor or the second link width scaling factor based on the comparison of the first link width scaling factor to the second link width scaling factor.

10. The system of claim 9, wherein the system is a selected one of a laptop, a netbook, a notebook, an ultrabook, a smartphone, a tablet, a personal digital assistant, an ultra mobile PC, a mobile phone, a desktop computer, a server, a printer, a scanner, a monitor, a set-top box, an entertainment control unit, a digital camera, a portable music player, or a digital video recorder.

11. The system of claim 9, further comprising a network interface operatively coupled with the link controller and the one or more processors to communicatively couple the system with a network.

12. The system of claim 9, wherein the display device is a touch screen.

13. The system of claim 9, wherein the link controller is integrated in one of the one or more processors.

14. The system of claim 9, further comprising a chipset operatively coupled to the one or more processors, wherein the link controller is included in the chipset.

15. A method comprising:
    determining a length of a queue of packets at a source of a link of an apparatus and a rate of utilization of the link; and
    modifying a width of the link based at least in part on the length of the queue and the rate of utilization;
    wherein modifying comprises
        comparing the length of the queue with a threshold length corresponding to a first link width scaling factor;
        comparing the rate of utilization with a threshold utilization rate corresponding to a second link width scaling factor; and
        comparing the first link width scaling factor to the second link width scaling factor; and
        modifying the width of the link by the first link width scaling factor or the second link width scaling factor based on the comparison of the first link width scaling factor to the second link width scaling factor.

16. The method of claim 15, further comprising setting the threshold length and the threshold utilization rate.

17. The method of claim 16, further comprising modifying at least one of the threshold length and the threshold utilization rate based at least in part on a number of active processor cores of the apparatus.

18. The method of claim 15, wherein the modifying comprises modifying the width of the link by the greater of the first link width scaling factor and the second link width scaling factor.

19. The method of claim 15, wherein the modifying comprises modifying the width of the link after a predetermined period of time elapses from a previous modification of the width of the link.

20. A non-transitory machine-readable medium having associated instructions that, when executed by a apparatus, cause the apparatus to:

determine a length of a queue of packets at a source of a link of an apparatus and a rate of utilization of the link; and modify a width of the link based at least in part on the length of the queue and the rate of utilization;

wherein to modify comprises to compare the length of the queue with a threshold length corresponding to a first link width scaling factor, to compare the rate of utilization with a threshold utilization rate corresponding to a second link width scaling factor, to compare the first link width scaling factor to the second link width scaling factor, and to modify the width of the link by the first link width scaling factor or the second link width scaling factor based on the comparison of the first link width scaling factor to the second link width scaling factor.

21. The non-transitory machine-readable medium of claim 20, wherein the apparatus is further caused to modify at least one of the threshold length and the threshold utilization rate based at least in part on a number of active processor cores of the apparatus.

* * * * *